UNITED STATES PATENT OFFICE.

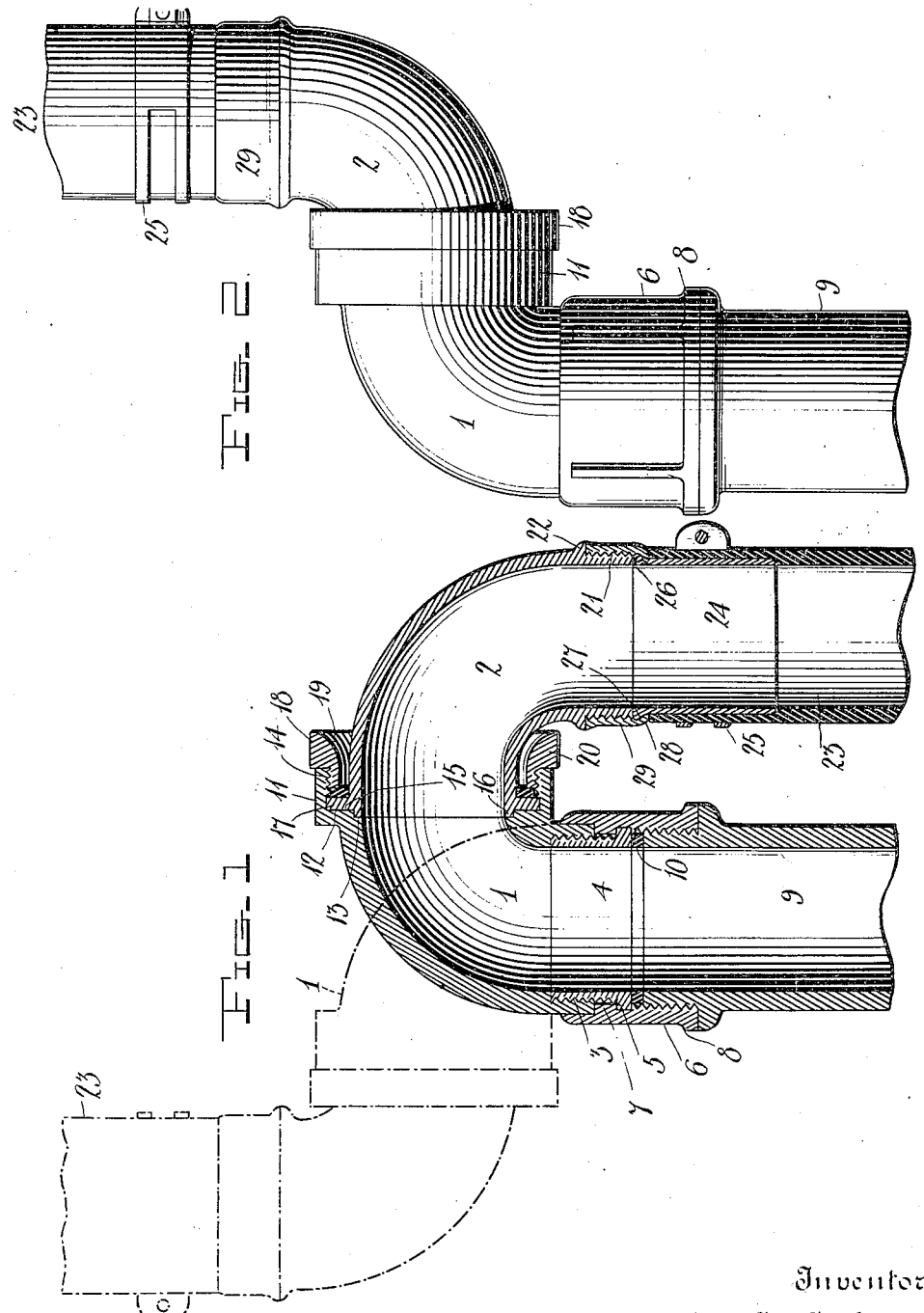

CHARLES C. CORLEW, OF FRESNO, CALIFORNIA.

HOSE-COUPLING.

No. 855,232.

Specification of Letters Patent.

Patented May 28, 1907.

Application filed September 18, 1905. Serial No. 278,984.

*To all whom it may concern:*

Be it known that I, CHARLES C. CORLEW, a citizen of the United States, residing at Fresno, in the county of Fresno and State of California, have invented certain new and useful Improvements in Hose-Couplings; and I do declare the following to be a full, clear, and exact description of the invention, such as will enable others skilled in the art to which it appertains to make and use the same.

My invention is an improved hose-coupling for use in attaching hose to hydrants or water-discharge pipes and to enable the hose to be turned in any direction without bending and injuring the hose and without diminishing the capacity of the hose, as would result from the bending of the same, and the consequent partial contraction or collapsing thereof.

In the accompanying drawings,—Figure 1 is a vertical section of a hose-coupling embodying my improvements, showing the coupling in use for connecting a hose to the discharge spout or pipe of a hydrant; and Fig. 2 is an elevation of the same.

My improved hose-coupling comprises an elbow member 1 having a swivel connection with the discharge nozzle or pipe of a hydrant, and an elbow member 2 having a swivel connection with the member 1. Each of the said elbow members is quarter-circular in form. The member 1 is provided at its inner end with interior screw threads 3, and in said end is screwed a sleeve 4. The said sleeve has on its outer side, at its outer end, an annular shoulder 5. A gland 6 is secured to the inner end of the member 1 by means of the sleeve 4, the shoulder 5 of the said sleeve engaging an internal shoulder 7 with which the gland is provided. Said gland is provided with a roughened or angular outer surface adapted for engagement by a wrench, whereby the gland may be turned, and the said gland is provided at its outer end with an annular shoulder 8. The inner portion of the gland extends beyond the shoulder 7 and surrounds the inner portion of the elbow member 1. That portion of the gland which projects beyond the shoulder 5 of the sleeve 4 is internally-screw-threaded, to enable it to engage the screw-threaded end of the spout 9 of a hydrant or other source of water. A washer 10 is secured between the end of the spout 9 and the opposing end of the sleeve 4.

It will be understood that the member 1 is adapted to turn freely in the gland 6, so that the said member 1 may be swung around the spout 9 and disposed in any desired direction. The outer end of the member 1 is enlarged, as at 11, and is provided on its inner side with an annular shoulder 12, in the inner edge of which is an annular countersink 13. The extreme outer end portion of the said member 1 is provided with internal screw threads 14.

The member 2 has its inner end provided with a shoulder 15, to bear against the shoulder 12, and a flange 16, to enter the countersink and bear against the shoulder formed by the base thereof. The inner end of the said member 2 is further formed with an annular projecting shoulder or flange 17, which effects a swivel connection with the outer end portion of the member 1. A gland 18 is screwed into the threaded end of the member 1 and bears against the shoulder or flange 17 of the member 2, thus serving to retain the latter in place and in swivel connection with the member 1. The interior diameter of the gland 18 is greater than the exterior diameter of the inner end of the member 2, and the inner side of the said gland is rounded or curved outwardly, as at 19. This enables said gland to be readily placed on the member 2, and to be passed from the outer end thereof to its inner end, thus greatly facilitating the assembling of the parts and avoiding the necessity of contracting the intermediate portion of the elbow member 2, which would be necessary if the interior of the gland were only about equal to the exterior diameter of said member 2. The said gland has a projecting portion 20 to bear against the outer end of the member 1 and adapted to be engaged and turned by a wrench of any suitable form.

The outer end of the member 2 is screw-threaded, as at 21, and has a shoulder 22 at the base of said screw-threaded portion. The flexible hose 23 is clamped on a sleeve 24 by means of a clamp 25. The inner end of said sleeve bears against the outer end of the member 2, as at 26, and has an outwardly-projecting flange 27, which flange is engaged by the interiorly-flanged inner end 28 of a gland 29 which is screwed to the outer end of the said member 2. Any suitable means may, within the scope of my invention, be employed to connect the hose to the outer elbow of the member 2.

It will be understood that the member 2, by reason of its swivel connection with the member 1, may be turned to any desired position with reference to said member 1 in a plane at right angles to the plane of movement of said member 1, so that my improved coupling adapts the hose for universal angular movement with reference to the hydrant or pipe to which it may be connected, and without the necessity of bending the hose.

Having thus described my invention, what I claim as new and desire to secure by Letters-Patent is:

An improved hose coupling comprising an elbow-member, having one end provided with internal screw-threads; a sleeve screwed into engagement with the threaded end of the elbow, and projecting beyond said end and having its extremity provided with an annular flange; a gland surrounding the sleeve and the end of the elbow, having a flange on its interior below one end, one side of said flange forming a shoulder which abuts the end of the elbow, and the other side of the flange being engaged by the flange on the sleeve, said gland having a portion projecting beyond the flanged end of the sleeve and internally threaded, and provided with an annular flange or shoulder at the outer extremity; a pipe section adapted to screw into engagement with the internal threads of the gland and to abut against the shoulder at the extremity thereof; and a washer or packing between the adjacent ends of the pipe section and the flange on the internal sleeve.

In testimony whereof I have hereunto set my hand in presence of two subscribing witnesses.

CHARLES C. CORLEW.

Witnesses:
J. W. GARNER,
CLARA H. GRIESBAUER.